United States Patent
Okamura et al.

(10) Patent No.: US 9,899,916 B2
(45) Date of Patent: Feb. 20, 2018

(54) BOOST CONVERTER CONTROL APPARATUS

(71) Applicant: TOYOTA JIDOSHA KABUSHIKI KAISHA, Toyota-shi, Aichi-ken (JP)

(72) Inventors: Masaki Okamura, Toyota (JP); Naoyoshi Takamatsu, Shizuoka-ken (JP); Hideto Hanada, Okazaki (JP); Kenji Yamada, Komaki (JP); Kosuke Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 80 days.

(21) Appl. No.: 14/440,415

(22) PCT Filed: Nov. 13, 2012

(86) PCT No.: PCT/JP2012/079350
§ 371 (c)(1),
(2) Date: May 4, 2015

(87) PCT Pub. No.: WO2014/076750
PCT Pub. Date: May 22, 2014

(65) Prior Publication Data
US 2015/0303798 A1  Oct. 22, 2015

(51) Int. Cl.
*H02M 3/156* (2006.01)
*H02M 3/157* (2006.01)
(Continued)

(52) U.S. Cl.
CPC .......... *H02M 3/157* (2013.01); *B60L 11/005* (2013.01); *B60L 15/007* (2013.01); *B60L 15/20* (2013.01);
(Continued)

(58) Field of Classification Search
CPC ................ B60L 15/20; B60L 2240/12; B60L 2240/421; B60L 2240/423;
(Continued)

(56) References Cited

U.S. PATENT DOCUMENTS 5,770,940 A    6/1998  Goder
2007/0080675 A1  4/2007  Gray et al.
(Continued)

FOREIGN PATENT DOCUMENTS

DE  102008018885 A1  10/2009
DE  112008003489 T5  11/2010
(Continued)

OTHER PUBLICATIONS

Office Action dated Apr. 5, 2017 in U.S. Appl. No. 14/441,938.
U.S. Patent and Trademark Office, Final Office Action in U.S. Appl. No. 14/441,938, dated Nov. 3, 2017, 13 pages.

*Primary Examiner* — Adolf Berhane
*Assistant Examiner* — Bart Iliya
(74) *Attorney, Agent, or Firm* — Andrews Kurth Kenyon LLP

(57) ABSTRACT

The present invention prevent a shortage of the output when an intermittent boost is executed. A control apparatus for controlling a boost converter that can boost power supply voltage by boost control has: an intermittent controlling device for executing the intermittent boosting in such a manner that output voltage is maintained in a voltage variation allowable range including a target value on the basis of the detected output voltage of the boost converter; an average value calculating device for calculating an average value of the output voltage in an execution period of the intermittent boosting; and a target value correcting device for correcting the set target value to increase it when the
(Continued)

calculated average value is less than the target value and is less than a required voltage value of a loading apparatus.

12 Claims, 10 Drawing Sheets

(51) Int. Cl.
  *H02M 1/00* (2006.01)
  *B60L 11/00* (2006.01)
  *B60L 15/00* (2006.01)
  *B60L 15/20* (2006.01)

(52) U.S. Cl.
  CPC ......... *H02M 3/156* (2013.01); *B60L 2240/12* (2013.01); *B60L 2240/421* (2013.01); *B60L 2240/423* (2013.01); *B60L 2240/547* (2013.01); *B60L 2240/549* (2013.01); *B60L 2260/26* (2013.01); *H02M 2001/0032* (2013.01); *Y02T 10/645* (2013.01); *Y02T 10/7022* (2013.01); *Y02T 10/72* (2013.01); *Y02T 10/7275* (2013.01)

(58) Field of Classification Search
  CPC ......... B60L 2240/547; B60L 2240/549; B60L 2260/26; H02M 2001/0032; H02M 3/156; H02M 3/157; Y02T 10/645
  See application file for complete search history.

(56) References Cited

U.S. PATENT DOCUMENTS

| | | |
|---|---|---|
| 2007/0278986 A1 | 12/2007 | Okamura |
| 2008/0143286 A1* | 6/2008 | Egami .................... B60K 6/445 318/432 |
| 2009/0033302 A1 | 2/2009 | Hariu |
| 2009/0206660 A1* | 8/2009 | Makita .................. H02J 7/1423 307/9.1 |
| 2009/0279337 A1* | 11/2009 | Hamatani ................. B60L 3/12 363/132 |
| 2010/0039836 A1 | 2/2010 | Gong et al. |
| 2010/0209792 A1 | 8/2010 | Umayahara et al. |
| 2010/0316922 A1* | 12/2010 | Hamada .................. B60L 1/003 429/432 |
| 2011/0062934 A1 | 3/2011 | Wolf et al. |
| 2011/0193539 A1 | 8/2011 | Schmidt et al. |
| 2012/0043900 A1* | 2/2012 | Chitta .................. H05B 41/295 315/201 |
| 2012/0069613 A1* | 3/2012 | Nakagawa ........ H02M 7/53871 363/78 |
| 2012/0091981 A1 | 4/2012 | Komiya |
| 2013/0187583 A1* | 7/2013 | Iwatsuki .................. H02P 6/10 318/400.17 |

FOREIGN PATENT DOCUMENTS

| | | |
|---|---|---|
| JP | H10127094 | 5/1998 |
| JP | 2006353032 | 12/2006 |
| JP | 2007325351 A | 12/2007 |
| JP | 2010-247725 A | 11/2010 |
| JP | 2011-015603 A | 1/2011 |

* cited by examiner

BOOST CONVERTER CONTROL APPARATUS

CROSS-REFERENCE TO RELATED APPLICATION

This is a national phase application based on the PCT International Patent Application No PCT/JP2012/079350 filed Nov. 13, 2012, the entire contents of which are incorporated herein by reference.

TECHNICAL FIELD

The present invention relates to a boost converter control apparatus configured to control a boost converter, for example, in a power supply system for a vehicle.

BACKGROUND ART

As an apparatus related to the control of the boost converter, a Patent Literature 1 discloses a control apparatus for a load drive system by which an output voltage of the boost converter can be kept even if operation of the boost converter is stopped in a extremely low load state.

According to this apparatus, switching operation of a converter is stopped when total load power, which is the sum of load powers of a plurality of loads, is a value in a predetermined range including zero. Moreover, when the total load power is the value in the predetermined range, a command that is outputted to any of load drive control units is corrected such that an absolute value of a deviation between a command value and the output voltage of the boost converter is reduced. Thus, the output voltage of the boost converter can be kept even if the operation of the converter is stopped in the extremely low load state. In addition, the loss of the boost converter can be reduced because the boost converter can be stopped in the extremely low load state or a no-load state.

In a technical field of fail-safe for an abnormal of a battery, there is also proposed a power supply control apparatus for an electric vehicle by which a gate of the boost converter is OFF-controlled when the battery is abnormal to make powers between motor generators MG1 and MG2 balance so as to maintain a relation of VL<VH between input-side voltage VL and output-side voltage VH of the boost converter (refer to Patent Literature 2).

CITATION LIST

Patent Literature

Patent Literature 1: Japanese Patent Application Laid Open No. 2011-015603
Patent Literature 2: Japanese Patent Application Laid Open No. 2010-247725

SUMMARY OF INVENTION

Technical Problem

Recently, switching performance of the boost converter has dramatically improved, and intermittent boosting, which cannot be conventionally realized, is also possible. The intermittent boosting namely means that a boosting operation and a boosting stop operation are actively repeated. If the intermittent boosting is executed, a boost loss of the boost converter becomes zero in a boosting stop period. Thus, the loss of the entire system including a power supply, the boost converter, and a loading apparatus (hereinafter it is referred to as a "system loss" as occasion demands) can be significantly reduced.

On the other hand, when the intermittent boosting is executed, the output voltage VH of the boost converter constantly varies according to a drive state of the loading apparatus in a predetermined range including a target value. Therefore, an effective value of the output voltage VH in an execution period of the intermittent boosting deviates from an original target value.

Here, the target value of the output voltage VH in the boost control is determined in such a manner that at least the loading apparatus can output required torque. However, when the aforementioned effective value is less than the target value, there is a possibility that the effective value is less than a required value corresponding to the required torque and that the loading apparatus cannot output the required torque. There is conventionally no effective solution to such a technical problem peculiar to the intermittent boosting.

The Patent Literature 1 apparently discloses a technical concept similar to the intermittent boosting; however, the technical concept disclosed in the Patent Literature 1 and the aforementioned intermittent boosting are, in fact, basically totally different. In other words, in the apparatus disclosed in the Patent Literature 1, a condition for deactivating the boost converter is that the output voltage VH (referred to as "secondary voltage V2" in the Patent Literature) of the boost converter does not decrease during the deactivation of the boost converter. In other words, this apparatus cannot deactivate the boost converter under a condition that the output voltage VH varies or cannot help varying. Except for an ideal no-load condition, for example, as described in a paragraph [0005] in the Patent Literature 1, in general, a low load variation occurs even under a condition which is defined as no load. In this apparatus, a change in the output voltage VH is suppressed by correcting command torque of the loading apparatus so as to suppress the load variation.

However, torque required for the loading apparatus is not related to circumstances on the boost converter side associated with the loss reduction. If actual output torque of the loading apparatus significantly deviates from a required value when the torque required for the loading apparatus is corrected, the loading apparatus hardly plays an original role. In particular, in a case where the loading apparatus is an electric motor for driving a vehicle, if torque supplied to a drive shaft connected to an axle shaft deviates from the required torque, power performance and drivability are likely significantly influenced. Therefore, in this apparatus, as consistently described in the Patent Literature, the control is effective only in a load region with the extremely low load (or in the predetermined range in which the total load power includes zero).

As described above, in the technical concept disclosed in the Patent Literature 1, it is not considered that the output voltage VH increases or decreases in the boosting stop period. Therefore, such a problem that the output torque of the loading apparatus is unexpectedly insufficient for the required value does not originally occur.

The present invention is invented in view of the aforementioned technical problem, and it is therefore an object of the present invention to provide a boost converter control apparatus configured to execute the intermittent boosting while satisfying drive requirements of the loading apparatus.

Solution to Problem

In order to solve the above problem, a first boost converter control apparatus of the present invention is a boost converter control apparatus which is configured to control a boost converter in a power supply system, the power supply system has: a DC (direct current) power supply having power supply voltage VB; the boost converter including a switching device, the boost converter being configured to boost and output the power supply voltage VB to a loading apparatus by boost control including switching of a switching state of the switching device according to a target value; and a voltage detecting device for detecting output voltage VH of the boost converter, the boost converter control apparatus has: an intermittent controlling device for executing an intermittent process of the boost control in such a manner that the output voltage VH is maintained in a predetermined range including the target value, on the basis of the detected output voltage VH; an average value calculating device for calculating an average value of the output voltage VH in an execution period of the intermittent process; and a target value correcting device for correcting the target value to increase the target value when the calculated average value is less than the target value and is less than a required voltage value of the loading apparatus (Claim 1).

The boost control means a control for boosting the power supply voltage VB to the target value of the output voltage VH according to a requirements from the loading apparatus side (i.e. a voltage command value) by the control of the switching state of the boots converter. In the intermittent boosting described later, the output voltage VH may have a value that is on a higher voltage side than the target value. In this case, the boost control is a control of stepping down the output voltage VH.

The target value of the output voltage VH is determined to satisfy generally two requirements; namely, a first requirement is to reduce the system loss (power loss of the entire power supply system including the DC power supply, the boost converter, and the loading apparatus), and a second requirement is to satisfy the required voltage of the loading apparatus (output voltage corresponding to required torque of the loading apparatus). Such a method of setting the target value is conventionally proposed. When the boost control is continuously executed, the output voltage VH converges to the target value in a stationary state. Therefore, when the target value that satisfies those requirements is set, the system loss can be reduced (or minimized) as much as possible without interfering with drive of the loading apparatus in the stationary state.

Moreover, according to the boost converter control apparatus of the present invention, the intermittent process of the boost control (hereinafter it is expressed as the "intermittent boosting" as occasion demands) is executed. The intermittent boosting is a process in which the stop of the boost control and the restart of the boost control (i.e. cancellation of the stop) are repeated, as described above. A boosting operation of the boost converter results in a boost loss caused by switching ripple of the switching device or the like, but the boost loss is zero in a period in which the boost control is stopped. Therefore, the execution of the intermittent boosting allows the system loss to be reduced.

The stop of the boost control in the intermittent boosting does not mean the stop of individual operation of each of switching elements that constitute the switching device, which occurs as occasion demands in the boost control, but means the stop of the boosting operation itself of the boost converter, i.e. shutdown. In general control of the boost converter of this type, the switching state of the switching element is changed (switched) every time a carrier signal, which is a triangular wave, matches a duty signal corresponding to boost command voltage. Here, if the switching device includes one switching element (e.g. a one-arm boost converter corresponds to this case), the switching device can be regarded as being temporarily fully stopped at timing at which the switching from ON to OFF is executed; however, such a full stop is merely a full stop that necessarily occurs as a part of the boost control, and is different in meaning from the stop of the boost control in the present invention.

Incidentally, a technical concept in which, instead of the intermittent execution of the boost control, the stop of the boost control is maintained as long as possible is well-known as described in the above described Citation List (e.g. the Patent Literature 1). In other words, in this case, the output voltage VH is maintained by the correction of the drive condition on the loading apparatus side, although the output voltage VH originally increases or decreases on the basis of a drive condition of the loading apparatus when the boost converter is in a stop state. Even this technical concept is the same in that the boost control of the boost converter is stopped.

However, the technical concept which considers only the loading apparatus side without allowing the variation of the output voltage VH as described above, namely, the technical concept in which the stop of the boost control has a unique relation with the maintenance of the output voltage VH of the boost converter is unnatural and unreasonable. That is because the only way is to stop the boost control only in an extremely limited load region in which the output voltage VH does not originally vary or to ignore a load which is required for the loading apparatus (e.g. drive torque for driving a vehicle on which the power supply system can be mounted), in order to maintain the output voltage VH against the natural laws by which electric energy which is stored in the boost converter increases when the loading apparatus is in a power regenerative state and the electric energy decreases when the loading apparatus is in a power-running state.

In contrast, the intermittent boosting in the present invention is an intermittent measurement of the boost control which is executed under the condition where the variation of the output voltage VH is allowed in the predetermined range which is preset or which is individually and specifically set at each time in accordance with a preset setting reference. In other words, the boost converter control apparatus of the present invention uses a technical concept which finds that an operating state of the boost converter can be used as a control element and positively uses the boost converter as a type of power control apparatus, on the basis of a recent dramatic improvement of switching performance of the switching device (e.g. switching frequency). Therefore, the boost control can be stopped without any problem even in such a load condition that the measurement only on the loading apparatus side cannot solve the problem. In comparison with the background art, a frequency at which the boost control is stopped is obviously higher and a period during which the boost control is stopped is obviously longer. It is therefore possible to appropriately reduce the system loss.

By the way, when the intermittent boosting is executed, the output voltage VH varies according to the drive state of the loading apparatus, and rarely converges to the target value in the stationary state. Thus, the intermittent boosting of the present invention is performed to maintain the output voltage VH in a predetermined range including the target value. The predetermined range in which the output voltage VH is to be maintained can include, for example, the following ranges (1) to (6). They can be also combined as occasion demands.

(1) a range on a higher voltage side than the power supply voltage VB;

(2) a range on a lower voltage side than withstand voltage of the boost converter;

(3) a range in which a deviation from the target value is within a predetermined value;

(4) a range in which a ratio to the target value is within a predetermined ratio;

(5) a range in which an increase amount of the loss which arises during load drive in comparison with the target value is within a predetermined value;

(6) a range in which an increase amount of the loss which arises during load drive in comparison with the target value is within a predetermined ratio.

Moreover, the predetermined range is determined desirably in view of a degree of a vibration of the output voltage VH (voltage vibration) and the required voltage of the loading apparatus. The voltage vibration is related to torque variation (fluctuation) of the loading apparatus, and if the predetermined range is too broad, the torque variation is likely to appear and cannot be ignored. Moreover, if a lower limit value of the predetermined range is greater than or equal to the required voltage value of the loading apparatus, there is a low possibility that the drive of the loading apparatus is limited by the variation of the output voltage VH which is caused by the intermittent boosting.

By the way, in the execution period of the intermittent boosting, the output voltage VH constantly varies, and it is thus not always accurate to use the output voltage VH to evaluate output characteristics of the boost converter during the execution of the intermittent boosting. More specifically, the use of the effective value of the output voltage VH such as, for example, the average value in a predetermined period, is practical for evaluation. The effective value of the output voltage VH is less than the target value when the loading apparatus is driven in a power running manner, and is greater than the target value when the loading apparatus is driven in a regenerative manner.

Here, if the required voltage of the loading apparatus (which may be expressed as the required torque or required output of the loading apparatus) increases when the loading apparatus is driven on a power running side, whether or not the boost converter can satisfy the requirements of the loading apparatus is an important factor. That is because a maximum output (or maximum torque) of the loading apparatus is insufficient for the required output (or required torque) if the output voltage VH of the boost converter is insufficient for the required voltage of the loading apparatus.

On the other hand, in the boost converter control apparatus of the present invention, the target value of the output voltage VH is corrected by using, as a determination index, the average value of the output voltage VH which is calculated by the average value calculating device. More specifically, the target value is corrected to be increased when the calculated average value is less than the target value and is less than the required voltage value of the loading apparatus. The average value of the output voltage VH is the aforementioned effective value, and the case where the average value is less than the target value namely means the case where the loading apparatus is driven in the power running manner. When the average value is less than the required voltage value during the power running drive, it is hardly possible to sufficiently respond to future or near-future (e.g. next) required voltage of the loading apparatus. If the target value is corrected to be increased, the average value of the output voltage VH in the intermittent boosting also increases. It is thus possible to prevent that the drive of the loading apparatus is limited.

Incidentally, the average value of the output voltage VH is a value obtained by executing a proper averaging process on the output voltage VH in the execution period of the intermittent boosting, and various methods can be used as the averaging process. For example, the averaging process may be a general addition/averaging process which adds the value of the output voltage VH detected in each of particular sampling cycles and divides an addition value with a length of sampling period. Alternatively, when the value of the output voltage VH detected does not have uniform reliability, the averaging process may be an addition/averaging process which is executed after placing higher weight on a more-reliable sampling value.

In one aspect of the first boost converter control apparatus of the present invention, the target value correcting device corrects the target value to increase the target value on the basis of a difference between the required voltage value and the calculated average value (Claim 2).

According to this aspect, the target value is corrected to be increased on the basis of the difference between the required voltage value and the average value. For example, the difference is added to the previous target value. Alternatively, a value which is obtained by multiplying the difference by a predetermined correction coefficient is added to the previous target value. Therefore, the target value can be appropriately corrected according to the required voltage value of the loading apparatus.

In another aspect of the first boost converter control apparatus of the present invention, the intermittent controlling device, when executing the intermitting process, stops the boost control when the detected output voltage VH reaches the target value in the execution period of the boost control, and restarts the boost control when the detected output voltage VH reaches a boundary value of the predetermined range in a stop period of the boost control (Claim 3).

According to this aspect, the output voltage VH of the boost converter can be appropriately maintained in the predetermined range.

Moreover, in the intermittent process of the boost control, the execution and the stop of the boost control are repeated in order as follows; the boost control is stopped, then, the boost control is restarted when the output voltage VH reaches the upper limit value or the lower limit value of the range due to the increase or decrease in the output voltage VH, and then, the boost control is stopped again when the output voltage VH reaches the target value or converges to the target value or the like and thus a stop condition is satisfied.

Now, if the process corresponding to the period including the execution period and the stop period of the boost control, which are continuous to each other in time series, in the intermittent process of the boost control is defined as the unit intermittent process, the intermittent boosting is realized by repeating the unit intermittent process. When the average value of the output voltage VH is calculated in the unit intermittent process, the deviation between the set target value and the average value can be used meaningfully for the correction of the target value of the boost control.

The "period including the execution period and the stop period of the boost control" conceptually includes a period from a stop time point of the boost control to a re-stop time point of the boost control through the restart of the boost control, and a period from a start time point of the boost control to a restart time point of the boost control through the stop of the boost control.

In another aspect of the first boost converter control apparatus of the present invention, the intermittent controlling device starts the intermittent process of the boost control when a variation width of the output voltage VH is within a predetermined value (Claim 4).

According to this aspect, the intermittent process is permitted if the variation width of the output voltage VH is within the predetermined value. The variation width of the output voltage VH is a concept including a quantitative index of behavior of the output voltage VH over a certain period of time, and the definition is not unique. For example, the variation width of the output voltage VH may be the average value of the deviation between the target value (or boost command voltage) and the output voltage VH in the certain period. Alternatively, the variation width may be the maximum value of the deviation between the target value (or boost command voltage) and the output voltage VH in the certain period. Alternatively, the variation width may be the maximum value of the change amount of the output voltage VH in the certain period.

According to this aspect, the execution of the intermittent process is permitted when the output voltage VH is stabilized, and thus, the effect of the reduction of total loss can be expected. Moreover, when the target value (or boost command voltage) changes, the output voltage VH changes accordingly, and as a result, the variation width tends to increase. In other words, according to this aspect, the execution of the intermittent process can be easily prohibited on the basis of the setting of the predetermined value, when the target value changes, and thus the effect of the reduction of total loss can be expected.

In order to solve the above problem, a second boost converter control apparatus of the present invention is a boost converter control apparatus which is configured to control a boost converter in a power supply system, the power supply system has: a DC (direct current) power supply having power supply voltage VB; the boost converter including a switching device, the boost converter being configured to boost and output the power supply voltage VB to a loading apparatus by boost control including switching of a switching state of the switching device according to a target value; and a voltage detecting device for detecting output voltage VH of the boost converter, the boost converter control apparatus has: an intermittent controlling device for executing an intermittent process of the boost control in such a manner that the output voltage VH is maintained in a predetermined range including the target value, on the basis of the detected output voltage VH; and a target value correcting device for correcting the target value to increase the target value when a lower limit value of the predetermined range is less than a required voltage value of the loading apparatus (Claim 5).

In the second boost converter control apparatus of the present invention, the target value is corrected to be increased when the lower limit value of the predetermined range is less than the required voltage value. As long as the intermittent boosting is executed in such a manner that the output voltage VH is maintained in the predetermined range, the lower limit value of the predetermined range is theoretically a minimum value of the average value of the output voltage VH. In other words, the use of the lower limit value of the predetermined range allows the drive requirements of the loading apparatus to be satisfied without using the process of calculating the average value of the output voltage VH.

According to the second boost converter control apparatus, although it is inferior in a correction accuracy of the target value because more safety-conscious determination is performed than that in the first boost converter control apparatus, it is excellent in responsivity because the process of calculating the average value is not required. In particular, a reasonable time is required to calculate the average value of the output voltage VH, and thus it is hard to calculate a practically useful average value, in some cases. For example, a case where the drive condition of the loading apparatus transiently changes or similar cases correspond to the above cases. In such cases, usually, the required voltage of the loading apparatus is relatively high, and immediacy is more required. Thus, the second boost converter control apparatus preferably functions.

In one aspect of the second boost converter control apparatus of the present invention, the target value correcting device corrects the target value to increase the target value on the basis of a difference between the required voltage value and the lower limit value (Claim 6).

According to this aspect, the target value is corrected to be increased on the basis of the difference between the required voltage value and the average value. For example, the difference is added to the previous target value. Alternatively, a value which is obtained by multiplying the difference by a predetermined correction coefficient is added to the previous target value. Therefore, the target value can be appropriately corrected according to the required voltage value of the loading apparatus.

In another aspect of the second boost converter control apparatus of the present invention, the intermittent controlling device, when executing the intermitting process, stops the boost control when the detected output voltage VH reaches the target value in the execution period of the boost control, and restarts the boost control when the detected output voltage VH reaches a boundary value of the predetermined range in a stop period of the boost control (Claim 7).

According to this aspect, the output voltage VH of the boost converter can be appropriately maintained in the predetermined range.

Moreover, in the intermittent process of the boost control, the execution and the stop of the boost control are repeated in order as follows; the boost control is stopped, then, the boost control is restarted when the output voltage VH reaches the upper limit value or the lower limit value of the range due to the increase or decrease in the output voltage VH, and then, the boost control is stopped again when the output voltage VH reaches the target value or converges to the target value or the like and thus a stop condition is satisfied.

Now, if the process corresponding to the period including the execution period and the stop period of the boost control, which are continuous to each other in time series, in the intermittent process of the boost control is defined as the unit intermittent process, the intermittent boosting is realized by repeating the unit intermittent process. When the average value of the output voltage VH is calculated in the unit intermittent process, the deviation between the set target value and the average value can be used meaningfully for the correction of the target value of the boost control.

The "period including the execution period and the stop period of the boost control" conceptually includes a period from a stop time point of the boost control to a re-stop time point of the boost control through the restart of the boost control, and a period from a start time point of the boost control to a restart time point of the boost control through the stop of the boost control.

In another aspect of the second boost converter control apparatus of the present invention, the intermittent controlling device starts the intermittent process of the boost control when a variation width of the output voltage VH is within a predetermined value (Claim 8).

According to this aspect, the intermittent process is permitted if the variation width of the output voltage VH is within the predetermined value. The variation width of the output voltage VH is a concept including a quantitative index of behavior of the output voltage VH over a certain period of time, and the definition is not unique. For example, the variation width of the output voltage VH may be the average value of the deviation between the target value (or boost command voltage) and the output voltage VH in the certain period. Alternatively, the variation width may be the maximum value of the deviation between the target value (or boost command voltage) and the output voltage VH in the certain period. Alternatively, the variation width may be the maximum value of the change amount of the output voltage VH in the certain period.

According to this aspect, the execution of the intermittent process is permitted when the output voltage VH is stabilized, and thus, the effect of the reduction of total loss can be expected. Moreover, when the target value (or boost command voltage) changes, the output voltage VH changes accordingly, and as a result, the variation width tends to increase. In other words, according to this aspect, the execution of the intermittent process can be easily prohibited on the basis of the setting of the predetermined value, when the target value changes, and thus the effect of the reduction of total loss can be expected.

In order to solve above problem, a third boost converter control apparatus of the present invention is a boost converter control apparatus which is configured to control a boost converter in a power supply system, the power supply system has: a DC (direct current) power supply having power supply voltage VB; the boost converter including a switching device, the boost converter being configured to boost and output the power supply voltage VB to a loading apparatus by boost control including switching of a switching state of the switching device according to a target value; and a voltage detecting device for detecting output voltage VH of the boost converter, the boost converter control apparatus has: an intermittent controlling device for executing an intermittent process of the boost control in such a manner that the output voltage VH is maintained in a predetermined range including the target value, on the basis of the detected output voltage VH; an average value calculating device for calculating an average value of the output voltage VH in an execution period of the intermittent process; and a prohibiting device for prohibiting the execution of the intermittent process when the calculated average value is less than the target value and is less than a required voltage value of the loading apparatus (Claim 9).

In the third boost converter control apparatus of the present invention, the intermittent boosting is prohibited instead of correcting the target value to increase the target value in the aforementioned first boost converter control apparatus, and normal boost control (or regular boosting) is executed. Therefore, although the effect of reducing the system loss according to the intermittent boosting cannot be obtained, it is possible to more certainly drive the loading apparatus.

In one aspect of the third boost converter control apparatus of the present invention, the intermittent controlling device starts the intermittent process of the boost control when a variation width of the output voltage VH is within a predetermined value (Claim 10).

According to this aspect, the intermittent process is permitted if the variation width of the output voltage VH is within the predetermined value. The variation width of the output voltage VH is a concept including a quantitative index of behavior of the output voltage VH over a certain period of time, and the definition is not unique. For example, the variation width of the output voltage VH may be the average value of the deviation between the target value (or boost command voltage) and the output voltage VH in the certain period. Alternatively, the variation width may be the maximum value of the deviation between the target value (or boost command voltage) and the output voltage VH in the certain period. Alternatively, the variation width may be the maximum value of the change amount of the output voltage VH in the certain period.

According to this aspect, the execution of the intermittent process is permitted when the output voltage VH is stabilized, and thus, the effect of the reduction of total loss can be expected. Moreover, when the target value (or boost command voltage) changes, the output voltage VH changes accordingly, and as a result, the variation width tends to increase. In other words, according to this aspect, the execution of the intermittent process can be easily prohibited on the basis of the setting of the predetermined value, when the target value changes, and thus the effect of the reduction of total loss can be expected.

In order to solve the above problem, a fourth boost converter control apparatus of the present invention is a boost converter control apparatus which is configured to control a boost converter in a power supply system, the power supply system has: a DC (direct current) power supply having power supply voltage VB; the boost converter including a switching device, the boost converter being configured to boost and output the power supply voltage VB to a loading apparatus by boost control including switching of a switching state of the switching device according to a target value; and a voltage detecting device for detecting output voltage VH of the boost converter, the boost converter control apparatus has: an intermittent controlling device for executing an intermittent process of the boost control in such a manner that the output voltage VH is maintained in a predetermined range including the target value, on the basis of the detected output voltage VH; and a prohibiting device for prohibiting the execution of the intermittent process when a lower limit value of the predetermined range is less than a required voltage value of the loading apparatus (Claim 11).

In the fourth boost converter control apparatus of the present invention, the intermittent boosting is prohibited instead of correcting the target value to increase the target value in the aforementioned second boost converter control apparatus, and the normal boost control (or regular boosting) is executed. Therefore, although the effect of reducing the system loss according to the intermittent boosting cannot be obtained, it is possible to more certainly drive the loading apparatus.

In one aspect of the fourth boost converter control apparatus of the present invention, the intermittent controlling device starts the intermittent process of the boost control when a variation width of the output voltage VH is within a predetermined value (Claim 12).

According to this aspect, the intermittent process is permitted if the variation width of the output voltage VH is within the predetermined value. The variation width of the output voltage VH is a concept including a quantitative index of behavior of the output voltage VH over a certain period of time, and the definition is not unique. For example, the variation width of the output voltage VH may be the average value of the deviation between the target value (or boost command voltage) and the output voltage VH in the certain period. Alternatively, the variation width may be the maximum value of the deviation between the target value (or boost command voltage) and the output voltage VH in the certain period. Alternatively, the variation width may be the maximum value of the change amount of the output voltage VH in the certain period.

According to this aspect, the execution of the intermittent process is permitted when the output voltage VH is stabilized, and thus, the effect of the reduction of total loss can be expected. Moreover, when the target value (or boost command voltage) changes, the output voltage VH changes accordingly, and as a result, the variation width tends to increase. In other words, according to this aspect, the execution of the intermittent process can be easily prohibited on the basis of the setting of the predetermined value, when the target value changes, and thus the effect of the reduction of total loss can be expected.

The operation and other advantages of the present invention will become more apparent from embodiments and examples explained below.

DESCRIPTION OF EMBODIMENTS

Embodiments of the Invention

Hereinafter, various embodiments of the present invention will be explained with reference to the drawings.

First Embodiment

Configuration of Embodiment

Figure 1:
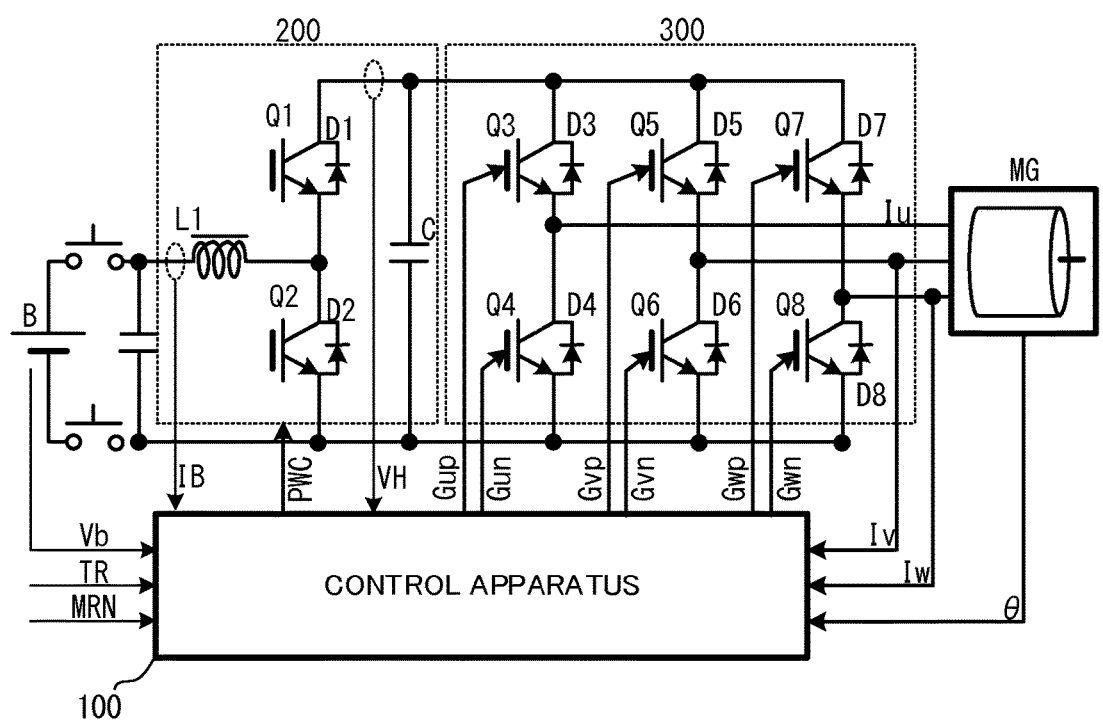
FIG. 1 is a system configuration diagram illustrating a motor drive system according to a first embodiment of the present invention.

Firstly, with reference to FIG. 1, a configuration of a motor drive system 10 according to this embodiment will be explained. FIG. 1 is a system configuration diagram conceptually illustrating the configuration of the motor drive system 10.

In FIG. 1, the motor drive system 10 is mounted on a not-illustrated vehicle, and is provided with a control apparatus 100, a boost converter 200, an inverter 300, and a direct current (DC) power supply B. The motor drive system 10 is configured to drive a motor generator MG as a loading apparatus, which is a source of a driving force for a vehicle, and is one example of the "power supply system" according to the present invention.

The control apparatus 100 is configured to control operation of the motor drive system 10, and is an electronic control unit, which is one example of the "boost converter control apparatus" according to the present invention. The control apparatus 100 is configured as a computer system, which can adopt forms of various electronic control apparatuses such as, for example, an electronic control unit (ECU), various controllers, microcomputer apparatuses, and the like. The control apparatus 100 is provided with a boost control unit 110 and an inverter control unit 120, which are not illustrated in FIG. 1, and a configuration of each of the control units will be described later. The control apparatus 100 is also provided with a storage apparatus such as a read only memory (ROM) and a random access memory (RAM).

The DC power supply B is a secondary battery unit with power supply voltage VB (e.g. 200 V) in which a plurality (e.g. several hundreds) of various secondary battery cells (e.g. cell voltage of several volts (V)) such as, for example, nickel hydrogen battery and a lithium ion battery are connected in series. As the DC power supply B, an electric double layer capacitor, a large-capacity condenser, a flywheel, or the like may be also used, instead of or in addition to this type of secondary battery.

The boost converter 200 is provided with a reactor L1, switching elements Q1 and Q2, diodes D1 and D2, and a capacitor C, and is a boost circuit as one example of the "boost converter" according to the present invention.

In the boost converter 200, one end of the reactor L1 is connected to a positive electrode line (whose reference numeral is omitted) which is connected to a positive electrode of the DC power supply B, and the other end is connected to a midpoint between the switching element Q1 and the switching element Q2, i.e. a connection point between an emitter terminal of the switching element Q1 and a collector terminal of the switching element Q2.

The switching elements Q1 and Q2 are connected in series between the above described positive electrode line and a negative electrode line (whose reference numeral is omitted) which is connected to a negative electrode of the DC power supply B, and is one example of the "switching device" according to the present invention. A collector terminal of the switching element Q1 is connected to the positive electrode line, and an emitter terminal of the switching element Q2 is connected to the negative electrode line. The diodes D1 and D2 are rectifying elements that allow only current flowing from the emitter side to the collector side, in the respective switching elements.

In the embodiment, the switching element includes the switching element Q1 on a higher potential side than the connection point at which the end of the reactor L1 is connected and the switching element Q2 on a lower potential side, and constitutes a two-arm boost converter. Such a configuration of the switching elements, however, is one example, and the boost converter may be a one-arm boost converter provided only with the switching element Q2 in FIG. 1.

The switching elements Q1 and Q2 and each of switching elements (Q3 to Q8) of the inverter 300 described later are configured, for example, as an insulated gate bipolar transistor (IGBT), a power metal oxide semiconductor (MOS) transistor, or the like.

The capacitor C is a condenser connected between the positive electrode line and the negative electrode line. Inter-terminal voltage of the capacitor C, i.e. a potential difference VH between the positive electrode line and the negative electrode line, is output voltage of the boost converter 200. Hereinafter, the output voltage VH of the capacitor C will be expressed as "output voltage VH" as occasion demands.

The inverter 300 is a power converter provided with a U-phase arm (whose reference numeral is omitted) including a p-side switching element Q3 and an n-side switching element Q4, a V-phase arm (whose reference numeral is omitted) including a p-side switching element Q5 and an n-side switching element Q6, and a W-phase arm (whose reference numeral is omitted) including a p-side switching element Q7 and an n-side switching element Q8. The respective arms of the inverter 300 are connected in parallel between the positive electrode line and the negative electrode line.

Incidentally, rectifying diodes D3 to D8 which are configured to make current flow from the emitter side to the collector side are respectively connected to the switching elements Q3 to Q8, respectively, as with the switching elements Q1 and Q2. Moreover, midpoints between the p-side switching elements and the n-side switching elements of the respective phase arms of the inverter 300 are respectively connected to phase coils of the motor generator MG.

The motor generator MG is a three-phase alternating current (AC) motor generator in which a permanent magnet is embedded in a rotor. The motor generator MG is mechanically coupled with not-illustrated drive wheels of a vehicle, and is configured to generate torque for driving the vehicle. The motor generator MG can also perform power regeneration (power generation) by using a motion energy of the vehicle mainly during braking the vehicle. If this vehicle is a hybrid vehicle which is provided with an engine as a power source in addition to the motor generator MG, the motor generator MG may be mechanically coupled with the engine, and may be configured to perform the power regeneration by using the power of the engine and assist the power of the engine. The vehicle according to the embodiment may be this type of hybrid vehicle, or may be an electric vehicle provided only with the motor generator MG as the power source.

In the motor drive system 10, a not-illustrated sensor group is attached so as to detect the voltage VB of the DC power supply B, a battery current IB flowing through the reactor L1 of the boost converter 200 (one example of the "current flowing through the DC power supply or the boost converter" according to the present invention), the output voltage VH, a v-phase current Iv and a w-phase current Iw of the inverter 300, a motor rotational phase θ, which is a rotation angle of the rotor of the motor generator MG, and the like. Each of sensors that constitute the sensor group is electrically connected to the control apparatus 100, and detected values are referred to by the control apparatus 100, as occasion demands.

In the motor drive system 10, the boost converter 200 and the inverter 300 are electrically connected to the control apparatus 100, and their drive states are controlled by the control apparatus 100.

Figure 2:
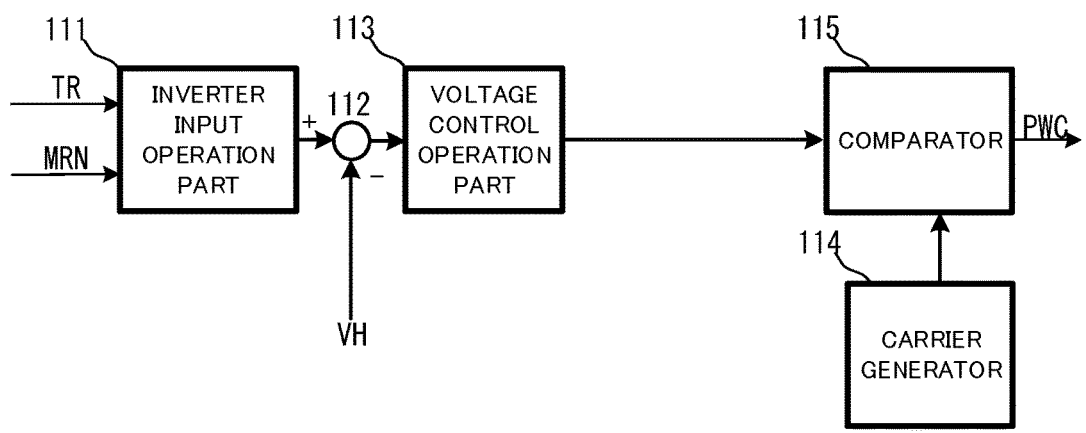
FIG. 2 is a block diagram illustrating a boost control unit in a control apparatus of the motor drive system in FIG. 1.

Next, with reference to FIG. 2, a configuration of the boost control unit 110 for controlling the boost converter 200 in the control apparatus 100 will be explained. FIG. 2 is a block diagram illustrating the boost control unit 110. In FIG. 2, the same parts as those in FIG. 1 will carry the same reference numerals, and the explanation thereof will be omitted as occasion demands.

In FIG. 2, the boost converter control unit 110 is provided with an inverter input operation part 111, an adder-subtractor 112, a voltage control operation part 113, a carrier generator 114, and a comparator 115. Incidentally, the boost converter control unit 110 is configured to execute boost control, an intermittent control process and an intermittent boosting auxiliary process described later, in accordance with a control program stored in the ROM in advance.

The boost control is control by which voltage between the positive electrode line and the negative electrode line, i.e. the output voltage VH, is boosted to be greater than or equal to the power supply voltage VB of the DC power supply B on the basis of a converter control signal PWC. In the boost control, when the output voltage VH is less than a target value VHtg (also referred to as a VH command value), on-duty of the switching element Q2 is set to be relatively large, which makes it possible to increase current flowing through the positive electrode line from the DC power supply B side to the inverter 300 side and to increase the output voltage VH. On the other hand, when the output voltage VH is greater than the target value VHtg, on-duty of the switching element Q1 is set to be relatively large, which makes it possible to increase current flowing through the positive electrode line from the inverter 300 side to the DC power supply B side and to reduce the output voltage VH.

The inverter input operation part 111 is a circuit configured to set the target value VHtg (i.e. one example of the "target value" according to the present invention) of the output voltage VH of the boost converter 200. The target value VHtg is determined to minimize a system loss Lsys, which is a loss of an entire power system including the boost converter 200, the inverter 300, and the motor generator MG.

The adder-subtractor 112 subtracts a detected value of the output voltage VH from the target value VHtg and outputs a subtraction result to the voltage control operation part 113. When receiving from the adder-subtractor 112 the subtraction result obtained by subtracting the detected value of the output voltage VH from the target value VHtg, the voltage control operation part 113 calculates a controlled variable for matching the output voltage VH with the target value VHtg. At this time, for example, known PI control calculation including a proportional term (P term) and an integral term (I term) or the like is used. The voltage control operation part 113 outputs the calculated controlled variable to the comparator 115 as a voltage command value.

The carrier generator 114 generates a carrier signal, which is a triangular wave, and transmits it to the comparator 115. The comparator 115 compares the voltage command value supplied from the voltage control operation part 113 with the carrier signal, and generates the aforementioned converter control signal PWC whose logical state varies depending on a magnitude relation of their voltage values. The generated converter control signal PWC is outputted to the switching elements Q1 and Q2 of the boost converter 200. The boost control unit 110 is configured as described above.

Figure 3:
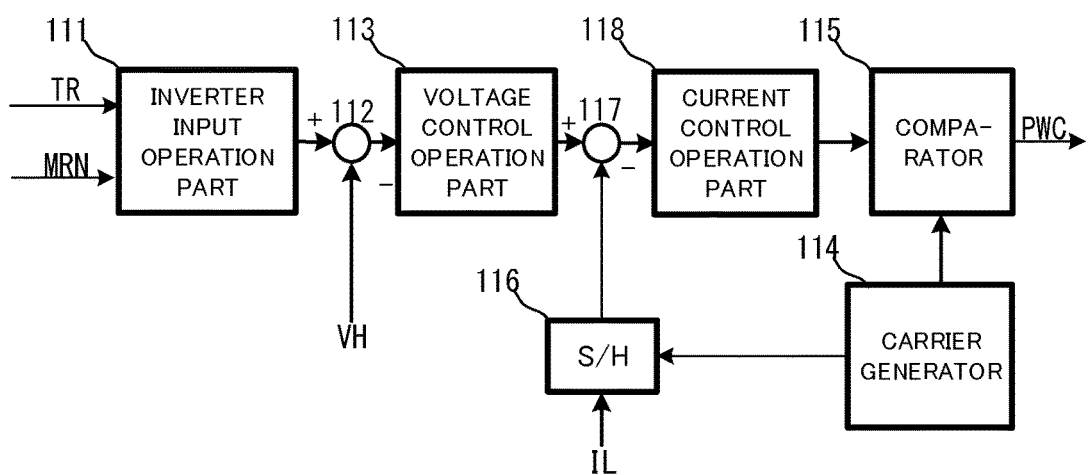
FIG. 3 is a block diagram illustrating another boost control unit in the control apparatus of the motor drive system in FIG. 1.

The configuration exemplified in FIG. 2 is a circuit configuration that realizes voltage control; however, a control method of the boost converter 200 is not limited to such voltage control. Now, with reference to FIG. 3, a configuration of a boost control unit 110' of the control apparatus 100 will be explained. FIG. 3 is a block diagram illustrating the boost control unit 110'. In FIG. 3, the same parts as those in FIG. 2 will carry the same reference numerals, and the explanation thereof will be omitted as occasion demands.

In FIG. 3, the boost control unit 110' is provided with an adder-subtractor 117 and a current control operation part 118, between the voltage control operation part 113 and the comparator 115.

The carrier generator 114 transmits the carrier signal to a sample hold (S/H) circuit 116, in addition to the comparator 115. The S/H circuit 116 samples the batter current IB in each timing of peaks and bottoms of the carrier signal received from the carrier generator 114.

Here, in the boost control unit 110', the voltage control operation part 113 generates a current command value IR for matching the output voltage VH with the target value VHtg. The adder-subtractor 117 subtracts a detected value of the battery current IB sampled and held by the S/H circuit 116, from the electric current command value IR. A subtraction result is transmitted to the current control operation part 118.

The current control operation part 118 calculates a controlled variable for matching the battery current IB with the current command value IR. At this time, for example, known PI control calculation including a proportional term (P term) and an integral term (I term) or the like is used. The current control operation part 118 outputs the calculated controlled variable to the comparator 115 as a duty command value d.

The comparator 115 compares a magnitude relation between the duty command value d and the carrier signal, and generates the converter control signal PWC and supplies it to each of switching elements. In other words, the boost control unit 110' has a circuit configuration that realizes current control. Even such a configuration allows the boost converter 200 to be preferably controlled.

Figure 4:
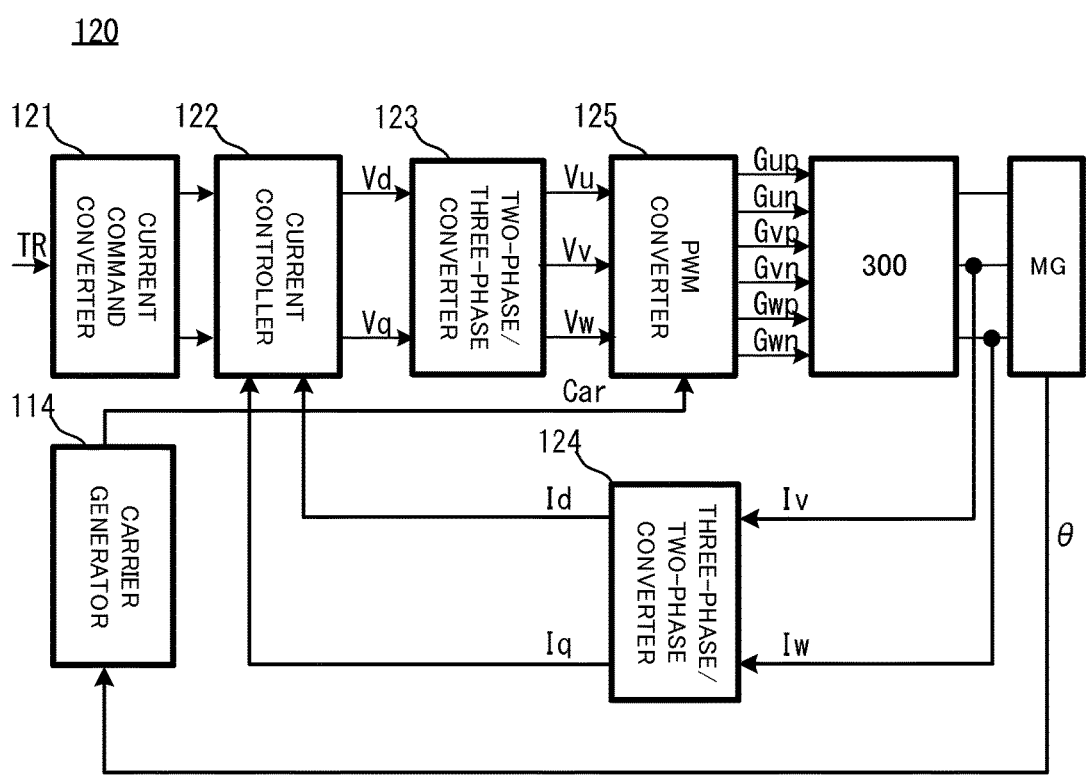
FIG. 4 is a block diagram illustrating an inverter control unit in the control apparatus of the motor drive system in FIG. 1.

Next, with reference to FIG. 4, a configuration of the inverter control unit 120 will be explained. FIG. 4 is a block diagram illustrating the inverter control unit 120. In FIG. 4, the same parts as those in each of the figures described above will carry the same reference numerals, and the explanation thereof will be omitted as occasion demands.

In FIG. 4, the inverter control unit 120 is provided with a current command converter 121, a current controller 122, a two-phase/three-phase converter 123, a three-phase/two-phase converter 124, a carrier generator 114 (shared with the boost control unit 110), and a PWM converter 125.

The current command converter 121 generates two-phase current command values (Idtg, Iqtg) on the basis of a torque command value TR of the motor generator MG.

On the other hand, from the inverter 300, the v-phase current Iv and the w-phase current Iw are supplied to the three-phase/two-phase converter 124 as feedback information. The three-phase/two-phase converter 124 converts three-phase current values which are the v-phase current Iv and the w-phase current Iw to two-phase current values, which include a d-axis current Id and a q-axis current Iq. The converted two-phase current values are transmitted to the current controller 122.

The current controller 122 generates two-phase voltage command values, which include a d-axis voltage Vd and a q-axis voltage Vq, on the basis of a difference between the two-phase current command values generated on the current command converter 121 and the two-phase current values Id and Iq received from the three-phase/two-phase converter 124. The generated two-phase voltage command values Vd and Vq are transmitted to the two-phase/three-phase converter 123.

The two-phase/three-phase converter 123 converts the two-phase voltage command values Vd and Vq to three-phase voltage command values Vu, Vv and Vw. The converted three-phase voltage command values Vu, Vv and Vw are transmitted to the PWM converter 125.

Here, the PWM converter 125 is configured to receive a carrier Car having a predetermined carrier frequency fcar from the carrier generator 114. The PWM converter 125 compares a magnitude relation between the carrier Car and the converted three-phase voltage command values Vu, Vv and Vw. Moreover, the PWM converter 125 generates u-phase switching signals Gup and Gun, v-phase switching signals Gyp and Gvn, and w-phase switching signals Gwp and Gwn, whose logical states vary depending on a comparison result, and supplies them to the inverter 300.

More specifically, of the switching signals corresponding to each phase, the signal with an identifier of "p" means a drive signal for driving the p-side switching element (Q3, Q5 or Q7) of the switching elements for each phase, and the signal with an identifier of "n" means a drive signal for driving the n-side switching element (Q4, Q6 or Q8) of the switching elements for each phase.

Here, in particular, when the carrier Car and the voltage command value for each phase are compared, when the voltage command value for each phase that is less than the carrier Car matches the carrier Car, the switching signal for turning on the p-side switching element is generated. Moreover, when the voltage command value for each phase that is greater than the carrier Car matches the carrier Car, the switching signal for turning on the n-side switching element is generated. In other words, the . The ma signals are signals which includes both of on and off, and either one of the p-side and n-side switching elements for each phase is always in the on state and the other is in the off state.

When the inverter 300 is changed to or maintained in a drive state of each of the switching elements which are defined by the switching signals for each phase, the motor generator MG is driven in accordance with a circuit state corresponding to the changed or maintained drive state. Such a control aspect of the inverter 300 is one aspect of so-called PWM control.

In general, in many cases, the motor generator MG for driving the vehicle also uses known overmodulation control and rectangular wave control, in addition to the aforementioned PWM control. Even in the motor drive system 10 according to the embodiment, the control aspect of the inverter 300 may be changed, as occasion demands, according to a traveling condition of the vehicle.

Operation of Embodiment

Next, as the operation of the embodiment, the intermittent control process and the intermittent boosting auxiliary process which are executed by the boost control unit 110 will be explained.

<Outline of Intermittent Control Process>

The boost converter 200 boosts the power supply voltage VB by the aforementioned boost control when the power supply voltage VB of the DC power supply B is needed to be boosted. In the boost control, the output voltage VH of the boost converter 200 is maintained at the target value VHtg in a stationary state. For example, the target value VHtg can have a value of approximately 650 V.

In contrast, switching states of the switching elements Q1 and Q2 of the boost converter 200 are constantly changed during a boosting operation accompanied by the boost control. The boost converter 200 always generates a boost loss Lcv in the boost control, because the change of the switching states results in a voltage variation referred to as switching ripple. The boost loss Lcv is a factor for increasing the system loss Lsys, which is the loss of the entire power system including the boost converter 200, the inverter 300, and the motor generator MG. The intermittent control process is control for reducing the system loss Lsys, and is a process for intermittently performing the aforementioned boost control (i.e. performing intermittent boosting).

<Details of Intermittent Control Process>

Figure 5:
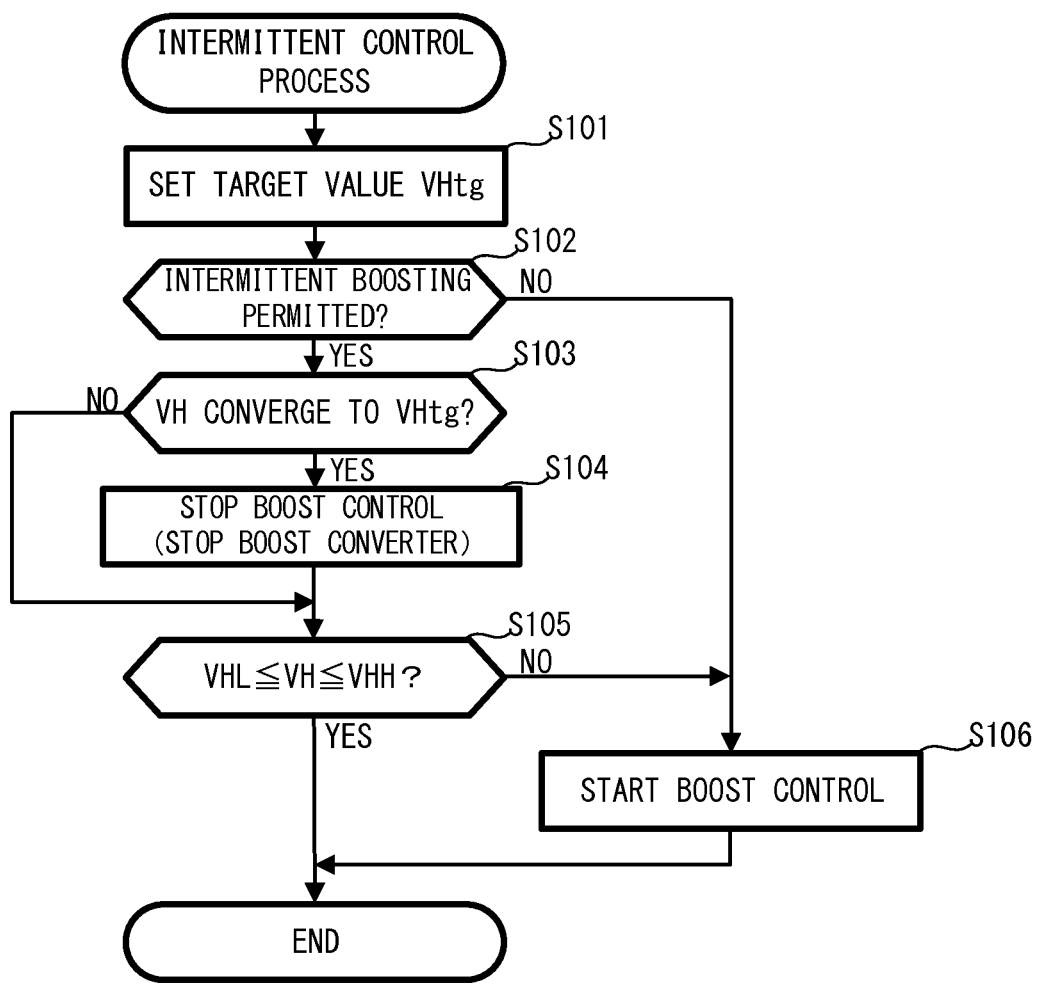
FIG. 5 is a flowchart illustrating an intermittent control process in the control apparatus of the motor drive system in FIG. 1.

Now, with reference to FIG. 5, the details of the intermittent control process will be explained. FIG. 5 is a flowchart illustrating the intermittent control process. The intermittent control process is control that is repeatedly performed with a predetermined period.

In FIG. 5, the target value VHtg, which is a target value of the output voltage VH in the boost control, is firstly set (step S101).

The target value VHtg is determined according to a drive condition of the motor generator MG, which is a loading apparatus. Specifically, a required output value, which is calculated from the torque command value TR and a motor rotational speed MRN of the motor generator MG, is used as the drive condition, and the target value VHtg is set from a relationship between the target value VHtg and the required output value, wherein the relationship is obtained experimentally, experientially, or theoretically in advance. The target value VHtg is set to a value that is sufficiently higher than the output voltage VH of the boost converter 200 which is required to generate required torque corresponding to the torque command value TR (hereinafter, it is expressed as required voltage VHn). Here, the term of "sufficiently high" specifically includes a case where a lower limit value of a voltage variation allowable range in the intermittent boosting (i.e. one example of the "predetermined range" according to the present invention) is higher than the required voltage VHn, wherein the lower limit value is obtained by adding or subtracting a predetermined offset value OFS to or from the target value VHtg (i.e. VHtg−OFS).

The method explained here is related to the second requirement (satisfying the required voltage of the loading apparatus) of the aforementioned requirements. Therefore, the target value VHtg is determined, desirably to sufficiently satisfy the first requirement (reducing the system loss) as well. Known methods can be used as the method of setting the target value VHtg for minimizing the system loss.

After the target value VHtg is set, it is determined whether or not the intermittent boosting is permitted (step S102). In the embodiment, the boost converter 200 is controlled basically by the intermittent boosting. Therefore, the intermittent boosting is basically permitted. However, in a high-load state such as a case where the motor generator MG is driven near a maximum output point (a maximum value of motor torque Tmg with respect to the certain motor rotational speed MRN), the intermittent boosting may be prohibited in order to ensure output performance of the motor generator MG. Namely, when the intermittent boosting is not permitted (the step S102: NO), the boost control is started (step S106), and the intermittent control process is ended. In this case, a step S103 to a step S105 are executed during a period when the intermittent boosting is not permitted, and thus, the boost control based on the target value VHtg is regularly performed.

When the intermittent boosting is permitted (the step S102: YES), it is determined whether or not the output voltage VH converges to the target value VHtg (step S103). When the output voltage VH converges to the target value VHtg (the step S103: YES), the boost converter 200 is shut down, and the boost control is stopped (step S104). When the boost control is stopped or when the output voltage VH does not converge to the target value VHtg in the step S103 (the step S103: NO), the step S105 is executed.

In the step S105, it is determined whether or not the output voltage VH is greater than or equal to a lower limit value VHL and is less than or equal to an upper limit value VHH of the voltage variation allowable range (step S105). As described above, the upper limit value VHH is obtained by adding the offset value OFS to the target value VHtg, and the lower limit value VHL is obtained by subtracting the offset value OFS from the target value VHtg. The value of the offset value OFS is set from the viewpoint of voltage variation and ensuring the output, and for example, the offset value OFS may be about 50 volts (V) when the target value VHtg is about 600 V.

When the output voltage VH is maintained in the voltage variation allowable range (the step S105: YES), the intermittent control process is ended. When the output voltage VH reaches or exceeds the upper limit value VHH or the lower limit value VHL of the voltage variation allowable range (the step S105: NO), the stop of the boost control is cancelled, and the boost control is restarted (step S106). Namely, the intermittent boosting is executed by the step S103 to the step S106. In the intermittent boosting, the output voltage VH varies between the target value VHtg and the lower limit value VHL when the motor generator MG is driven in the power-running manner, and the output voltage VH varies between the target value VHtg and the upper limit value VHH when the motor generator MG is driven in the regenerative manner.

In the voltage variation allowable range according to the embodiment, the upper limit value VHH is set to "VHtg+OFS" and the lower limit value VHL is set to "VHtg−OFS" by using the offset value OFS; however, such an aspect of setting the voltage variation allowable range is one example. For example, the upper limit value VHH and the lower limit value VHL may be set by multiplying the target value VHtg by a predetermined coefficient. In this case, a correction coefficient for defining the upper limit value VHH is greater than 1, and a correction coefficient for defining the lower limit value VHL is less than 1.

<Effect of Intermittent Control Process>

Figure 6:
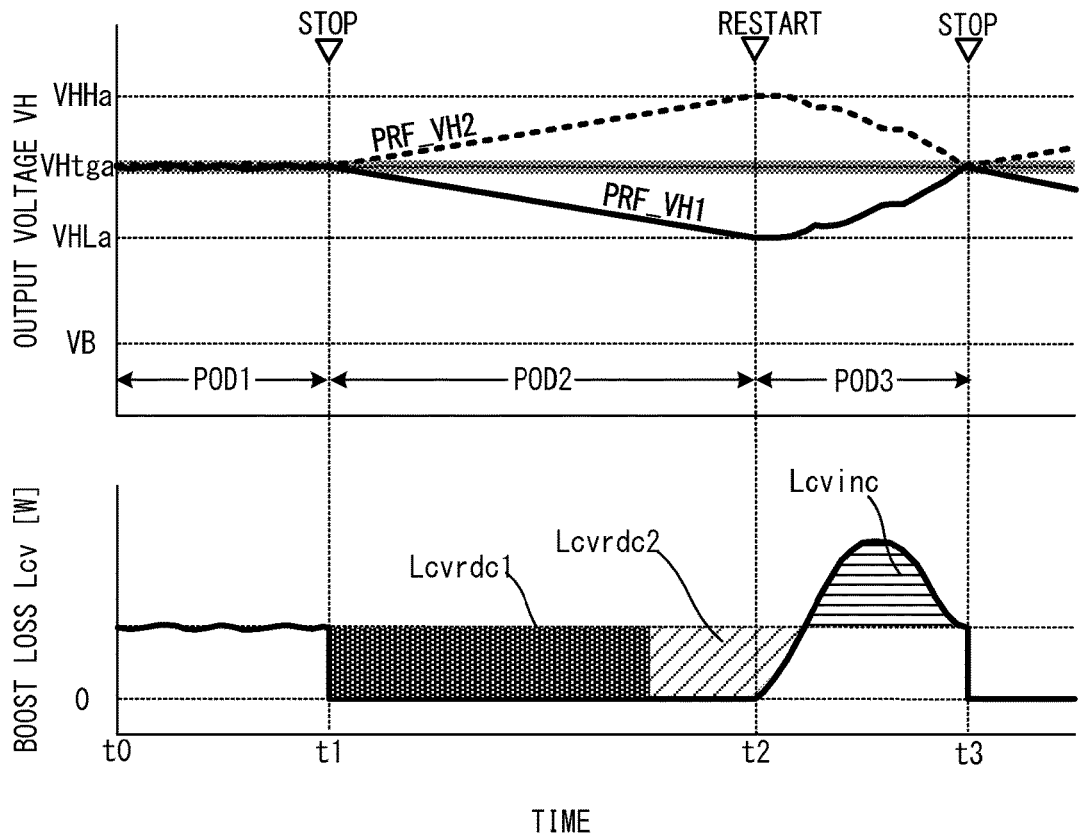
FIG. 6 is a timing chart illustrating one temporal transition of output voltage VH and a boost loss Lcv of a boost converter during the execution of the intermittent control process in FIG. 5.

Next, with reference to FIG. 6, an effect of the intermittent control process will be explained. FIG. 6 is a timing chart illustrating one temporal transition of the output voltage VH and the boost loss Lcv during the implementation of the intermittent control process.

In FIG. 6, an upper part indicates the temporal transition of the output voltage VH, and a lower part indicates the temporal transition of the boost loss Lcv. In FIG. 6, it is assumed that the target value VHtg is VHtga (VHtga>VB).

In the temporal transition of the output voltage VH, the output voltage VH at a time point t0 is substantially stable at a target value VHtga. In other words, the output voltage VH converges in a stop allowable range which is hatched in the drawing. Now, it is assumed that the stable state continues until a time point t1 and thus and the boost converter 200 is stopped.

When the boost converter 200 is stopped, the output voltage VH increases or decreases according to the drive state of the motor generator MG, which is a loading apparatus. FIG. 6 illustrates, as an illustrated PRF_VH1 (or a solid line), the temporal transition in which the motor generator MG is in the power-running state and in which the output voltage VH decreases after the time point t1. Moreover, FIG. 6 illustrates, as an illustrated PRF_VH2 (or a dashed line), the temporal transition in which the motor generator MG is in the regenerative state and in which the output voltage VH increases after the time point t1. Hereinafter, PRF_VH1 will be exemplified for explanation.

When the output voltage VH that keeps decreasing after the time point t1 reaches a lower limit value VHLa, which is set on the basis of the target value VHtga, at a time point t2, the step S105 in the above described intermittent control process branches to the "NO" side, and the boost control is restarted. As a result, the output voltage VH returns to the target value VHtga at a time point t3. When the output voltage VH reaches the target value VHtga at the time point t3, the boost converter 200 is stopped again.

On the other hand, the temporal transition of the boost loss Lcv illustrates that the boost loss Lcv, which is substantially constant in a first period POD1 from the time point t0 to the time point t1, becomes zero when the boost control is stopped at the time point t1. The boost loss Lcv is maintained at zero in a second period POD2 from the time point t1 to the time point t2 at which the boost control is restarted. When the boost control is restarted at the time point t2, the boost loss Lcv increases and becomes a value that is greater than zero in a third period POD3 from the time point t2 to a time point t3 at which the boost control is stopped again.

Here, a period which is obtained by combining the second period POD2 and the third period POD3 in FIG. 6 is a period that is from the stop of the boost control to the re-stop of the boost control through the cancellation of the stop, and corresponds to one example of the above described "period including the execution period and the stop period of the boost control, which are continuous to each other, in the intermittent process of the boost control". In other words, the process in the period which is obtained by combining the second period POD2 and the third period POD3 is one example of the above described "unit intermittent process". Hereinafter, the process in the period which is obtained by combining the second period POD2 and the third period POD3 is expressed as the "unit intermittent process" as occasion demands.

Here, period which is obtained by combining the second period POD2 and the third period POD3 is regarded as a period which defines the unit intermittent process, but this is merely one example. In other words, the "period including the execution period and the stop period of the boost control, which are continuous to each other" may be, for example, a period which is obtained by combining the third period POD3 and a subsequent stop period of the boost control partially not illustrated (a period from the time point t3 to a restart time point of the boost control), with reference to FIG. 6. Therefore, for example, a process in the period which is obtained by combining the third period POD3 and the subsequent stop period of the boost control is also one preferable example of the "unit intermittent process".

The total of the boost loss Lcv in the unit intermittent process is a difference between a loss decrease amount and a loss increase amount, when a loss in the case where the output voltage VH is maintained at the target value VHtg is a reference (i.e. zero).

The loss decrease amount is the sum of an illustrated loss decrease amount Ldvrdc1 (dark oblique hatching) and an illustrated loss decrease mount Lcvrdc2 (light oblique-line hatching), and the loss increase amount is an illustrated loss increase amount Lcvinc (horizontal hatching). In FIG. 6, an absolute value of the loss decrease amount Lcvrdc2 is equal to an absolute value of the loss increase amount Lcvinc, and the total of the boost loss Lcv realized by the intermittent control process is equal to the loss decrease amount Lcvrdc1. It is clear that the boost loss Lcv is significantly reduced by the intermittent control process, because the loss decrease amount Lcvrdc1 is a negative value. The total further increases to the negative side as the output voltage VH varies more slowly after the stop of the boost control.

Figure 7:
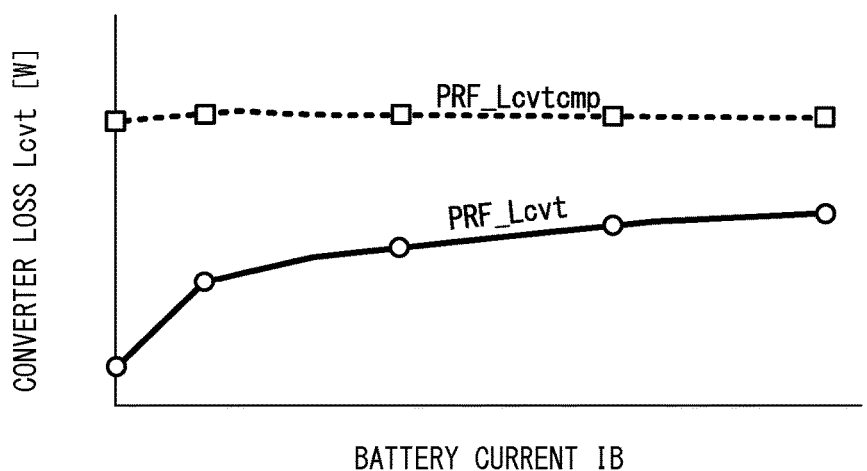
FIG. 7 is a diagram illustrating a relation between a converter loss Lcvt and a battery current IB when the intermittent control process in FIG. 5 is executed.

Next, with reference to FIG. 7, the boost loss Lcv generated in the boost converter 200 per unit time in the intermittent control will be explained. FIG. 7 is a diagram illustrating a relation between a converter loss Lcvt and the battery current IB when the intermittent control is executed. The converter loss Lcvt is a value obtained by dividing the sum of the boost loss Lcv in the unit intermittent process by a length of the period of the unit intermittent process, and means the boost loss Lcv generated in the boost converter 200 per unit time.

FIG. 7 illustrates the converter loss Lcvt on a vertical axis and the battery current IB on a horizontal axis.

An illustrated PRF_Lcvtcmp (refer to a dashed line) is a comparative example, and represents the converter loss in the case where the output voltage VH is maintained at the target value VHtg in the period without the intermittent control process according to the embodiment executed.

On the other hand, an illustrated PRF_Lcvt (refer to a solid line) indicates the converter loss Lcvt in the case where the intermittent control process according to the embodiment is executed. As described above, when the intermittent control process according to the embodiment is executed, the boost loss Lcv becomes zero in the second period POD2 as illustrated in FIG. 6, and thus, the converter loss Lcvt, which is a value per unit time, is reduced more significantly than that in the comparative example even if the boost loss Lcv increases to some degree in the third period POD3. In particular, when the battery current IB is sufficiently small, the converter loss Lcvt is significantly reduced because the second period POD2 is relatively long. In other words, according to the intermittent control process, the system loss Lsys can be reduced by reducing the converter loss Lcvt.

<Problem of Intermittent Boosting>

Figure 8:
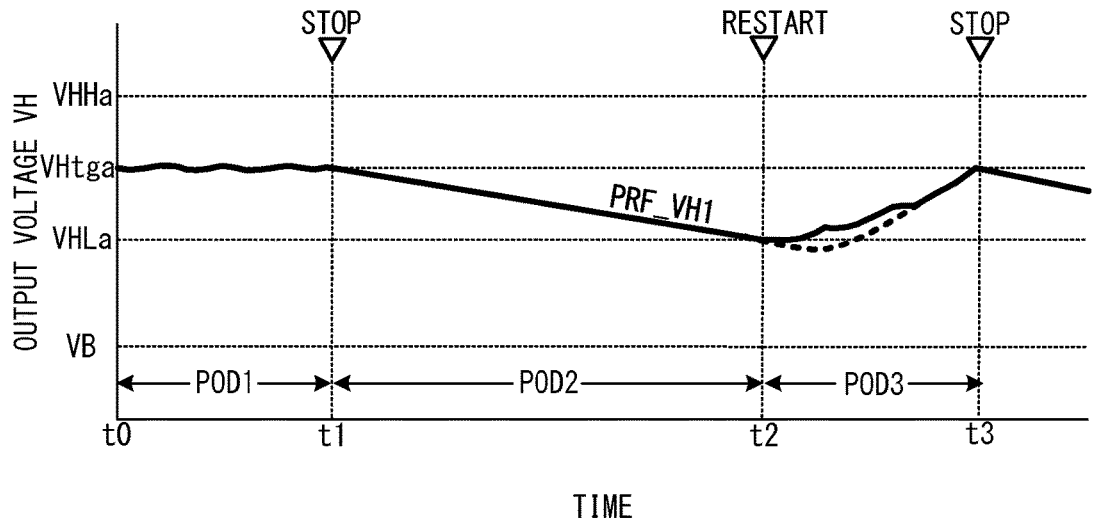
FIG. 8 is a diagram explaining undershoot of the output voltage VH.

Now, a problem of the intermittent boosting will be explained with reference to FIG. 8. FIG. 8 is a diagram explaining the output voltage VH during the execution of the intermittent boosting. In FIG. 8, the same parts as those in each of the figures described above will carry the same reference numerals, and the explanation thereof will be omitted as occasion demands.

FIG. 8 illustrates the change of the output voltage VH during the power running which is illustrated in FIG. 6.

Here, the output voltage VH reaches the lower limit value VHLa at the time point t2 during continuation of the stop of the boost control, and the boost control is restarted. In this case, ideally, the output voltage VH does not fall below the lower limit value VHLa of the voltage variation allowable range, as illustrated in a solid line. On a practical operation side, however, even if the boost control is restarted at the time point t2, the output voltage VH keeps decreasing (refer to a dashed line) even for an extremely short time in which the boost converter 200 actually starts to operate. Thus, the output voltage VH transiently undershoots, and falls below the lower limit value VHLa in some cases.

The target value VHtg of the output voltage VH is set in such a manner that the lower limit value VHL of the voltage variation allowable range exceeds a required voltage value VHn at that time point. However, if the output voltage VH undershoots as described above, there is a possibility that the output voltage VH becomes less than the required voltage value VHn in some cases. Specially, if this type of undershoot occurs, the above possibility is not necessarily low because the power consumption of the motor generator MG is relatively large.

Figure 9:
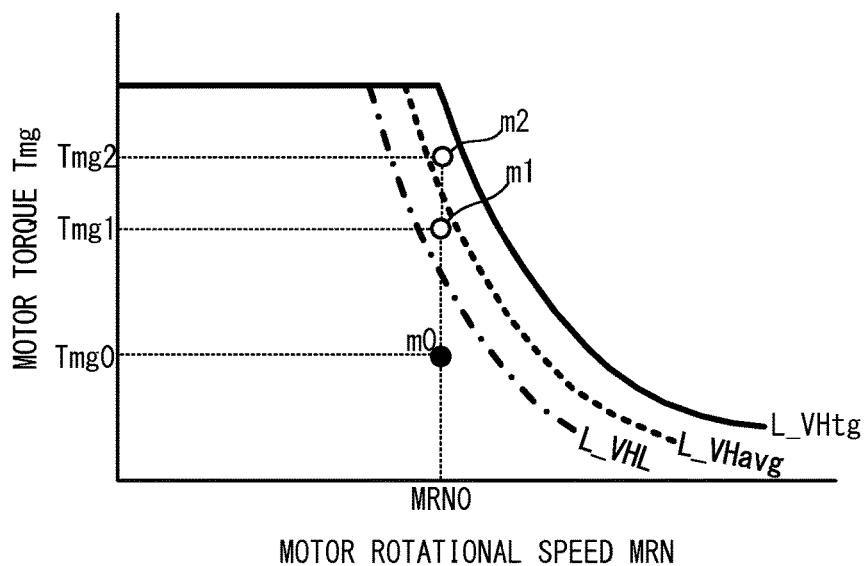
FIG. 9 is a diagram explaining a change of a drive condition of a motor generator.

Next, in the same manner, the problem of the intermittent boosting will be explained with reference to FIG. 9. FIG. 9 is a diagram explaining a change of the drive condition of the motor generator MG.

FIG. 9 respectively illustrates the motor torque Tmg and the motor rotational speed MRN on a vertical axis and a horizontal axis. Namely, a point on this coordinate plane corresponds to one operating point of the motor generator MG.

Here, it is assumed that a current operating point of the motor generator MG is an illustrated operating point m0 (black circle). The operating point m0 is a point with motor torque Tmg0 and a motor rotational speed MRN0. It is assumed that a next target operating point corresponding to a next torque command value TR is determined to be an illustrated operating point m1 after the above situation. The operating point m1 is a point with motor torque Tmg1 (Tmg1>Tmg0) and the motor rotational speed MRN0.

On the other hand, a maximum torque line according to the output voltage VH of the boost converter 200 can be drawn on the coordinate plane. The maximum torque line is a line which represents maximum torque which the motor generator MG can output by using the output voltage VH. In FIG. 9, the maximum torque lines corresponding to the target value VHtg, an average value VHavg, and the lower limit value VHL are respectively expressed as L_VHtg (solid line), L_VHavg (dashed line), and L_VHL (alternate long and short dash line). A common part of the lines is expressed as a solid line. The average value VHavg corresponds to an effective value of the output voltage VH during the execution of the intermittent boosting, and is an addition average value of the output voltage VH in one unit intermittent process, as described later.

As illustrated, the current operating point m0 is on a lower side than the maximum torque line L_VHL corresponding to the lower limit value VHL, and even if the output voltage VH is reduced to the lower limit value VHL by the intermittent boosting, the motor generator MG can output required torque Tmgn corresponding to the torque command value TR at a current time point without a problem.

Here, it is assumed that the next target operating point changes to the illustrated operating point m1. The operating point m1 is on a higher torque side than the maximum torque line L_VHL corresponding to the lower limit value VHL. If the output torque VH is reduced to the lower limit value VHL by the intermittent boosting, the motor generator MG cannot output the required torque Tmgn.

It is also assumed that the next target operating point corresponding to the next torque command value TR is determined to be an illustrated operating point m2. The operating point m2 is a point with motor torque Tmg2 (Tmg2>Tmg1) and the motor rotational speed MRN0. The operating point m2 is on the higher torque side than the maximum torque line L_VHavg corresponding to the average value VHavg, and if there is the variation in the output voltage VH by the intermittent boosting, the motor generator MG cannot output the required torque Tmgn.

<Details of Intermittent Boosting Auxiliary Process>

Figure 10:
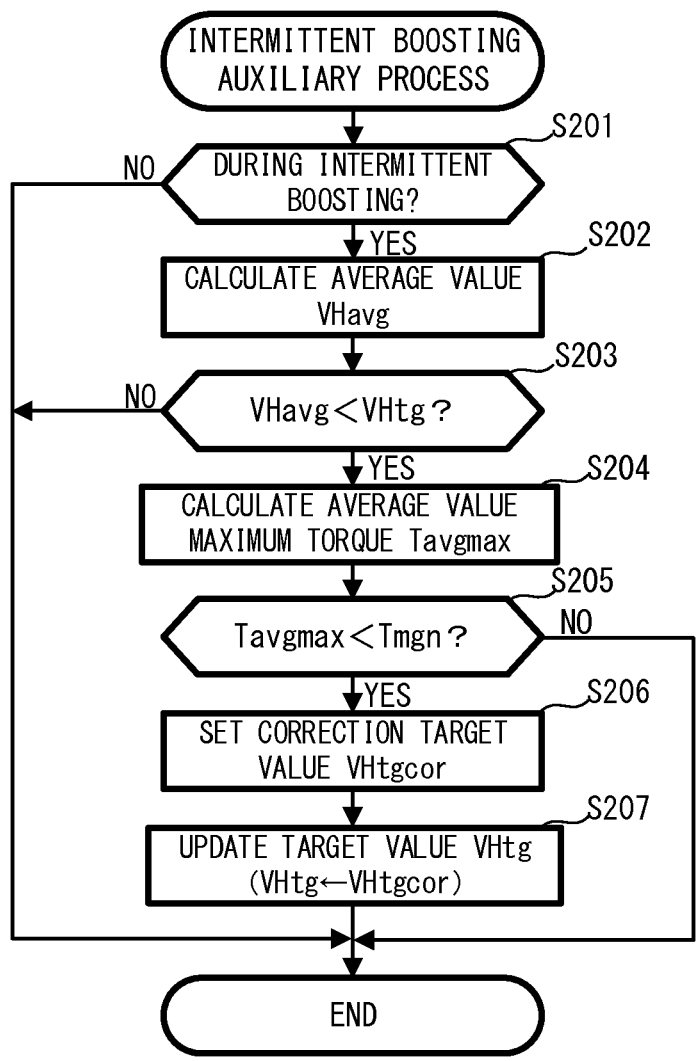
FIG. 10 is a flowchart illustrating an intermittent boosting auxiliary process in the motor drive system in FIG. 1.

In order to solve such a problem, in the embodiment, an intermittent boosting auxiliary process is executed. Here, with reference to FIG. 10, the intermittent boosting auxiliary process will be explained. FIG. 10 is a flowchart illustrating the intermittent boosting auxiliary process. The intermittent boosting auxiliary process is also a process that is repeatedly executed with a predetermined period, as in the intermittent control process.

In FIG. 10, it is firstly determined whether or not the intermittent boosting is executed (step S201). When the intermittent boosting is not executed for some reasons (the step S201: NO), the intermittent boosting auxiliary process is ended.

On the other hand, when the intermittent boosting is executed (the step S201: YES), the average value VHavg of the output voltage VH is calculated (step S202). The average value VHavg is obtained by adding and averaging a plurality of values of the output voltage VH detected in accordance with a predetermined sampling period in the aforementioned unit intermittent process. The calculation of the average value in the unit intermittent process allows accurate estimation of the effective output voltage VH in the intermittent boosting. Here, although it is configured in such a manner that the average value of the output value VH in one unit intermittent process is obtained, it may be configured in such a manner that respective average values are obtained in a plurality of unit intermittent processes and the respective average values are further added and averaged. In this manner, the average value with a reduced error can be obtained. Moreover, here, the average value is assumed to be an addition average value; however, it is obvious that various known aspects can be used as an averaging process for obtaining the average value.

After the average value VHavg of the output voltage VH is calculated, it is determined whether or not the calculated average value VHavg is less than the target value VHtg (step S203). When the average value VHavg is greater than the target value VHtg (the step S203: NO), the motor generator MG is in the regenerative state and there is no problem associated with not reaching the required torque. Therefore, the intermittent boosting auxiliary process is ended.

On the other hand, when the calculated average value VHavg is less than the target value VHtg (the step S203: YES), i.e. when the motor generator MG is driven in the power running manner in the execution period of the intermittent boosting, average value maximum torque Tavgmax is calculated (step S204). The average value maximum torque Tavgmax is a value corresponding to the motor rotational speed MRN on L_VHavg in FIG. 9 and is a maximum torque that can be outputted from the motor generator MG with the average value VHavg. A relation between the value of the output voltage VH of the boost converter 200 and the corresponding maximum torque of the motor generator MG is obtained, experimentally, experientially, or theoretically in advance, and is stored in the ROM.

After the average value maximum torque Tavgmax is calculated, it is determined whether or not the calculated average value maximum torque Tavgmax is less than the required torque Tmgn of the motor generator MG (step S205). When the average value maximum torque Tavgmax is greater than or equal to the required torque Tmgn (the step S205: NO), the intermittent boosting auxiliary process is ended.

On the other hand, when the average value maximum torque Tavgmax is less than the required torque Tmgn (the step S205: YES), a correction target value VHtgcor is set (step S206). After the correction target value VHtgcor is set, the target value VHtg is updated from the current target value VHtg to the correction target value VHtgcor (step S207). After the correction target value VHtgcor is newly set to the target value VHtg, the target value of the boost control in the intermittent control process in FIG. 5 is the newly set target value VHtg.

Here, the correction target value VHtgcor is determined, for example, in the following procedure.

Firstly, a difference value $\Delta T$ between the required torque Tmgn and the average value maximum torque Tavgmax ($\Delta T$=Tmgn−Tavgmax) is calculated. Then, the current target value VHtg and the difference value $\Delta T$ are added to calculate the correction target value VHtgcor (VHtgcor=VHtg+$\Delta T$). The difference value $\Delta T$ is a positive value, and thus the correction target value VHtgcor is greater than the target value VHtg at that time point. Namely, the target value VHtg is corrected to be increased.

Incidentally, the average value VHavg is an actual value which reflects a result of actual execution of the intermittent boosting, and thus the average value maximum torque Tavgmax corresponding to a new average value VHavg may not be greater than or equal to the required torque Tmgn when the intermittent boosting is executed by newly setting the correction target value VHtgcor as the target value VHtg. However, all the lines of L_VHtg, L_VHavg, and L_VHL in FIG. 9 are certainly shifted to the right in FIG. 9 due to the correction target value VHtgcor, and the requirements on the loading apparatus side are certainly satisfied in comparison with that before the correction. Moreover, such a correction is not necessarily ended only one time, and the average value VHavg of the output voltage VH exceeds the required voltage VHn (output voltage corresponding to the required torque Tmgn) in the end during repetitive execution of the intermittent boosting auxiliary process. Therefore, a limitation to the drive of the motor generator MG, which is the loading apparatus, is quickly canceled. Of course, if a relation between the difference value $\Delta T$ and the target value VHtg before the correction is defined in advance by experimental, experiential, or theoretical specification, the target value VHtg can be also corrected more accurately. For example, a correction coefficient by which the difference value $\Delta T$ is to be multiplied may be prepared in advance.

As described above, according to the embodiment, when the motor generator MG is driven in the power running manner during the execution of the intermittent boosting, it is possible to preferably prevent the shortage of the output of the motor generator MG which is caused by a decrease of the effective value of the output voltage VH (here, the average value VHavg).

Second Embodiment

Figure 11:
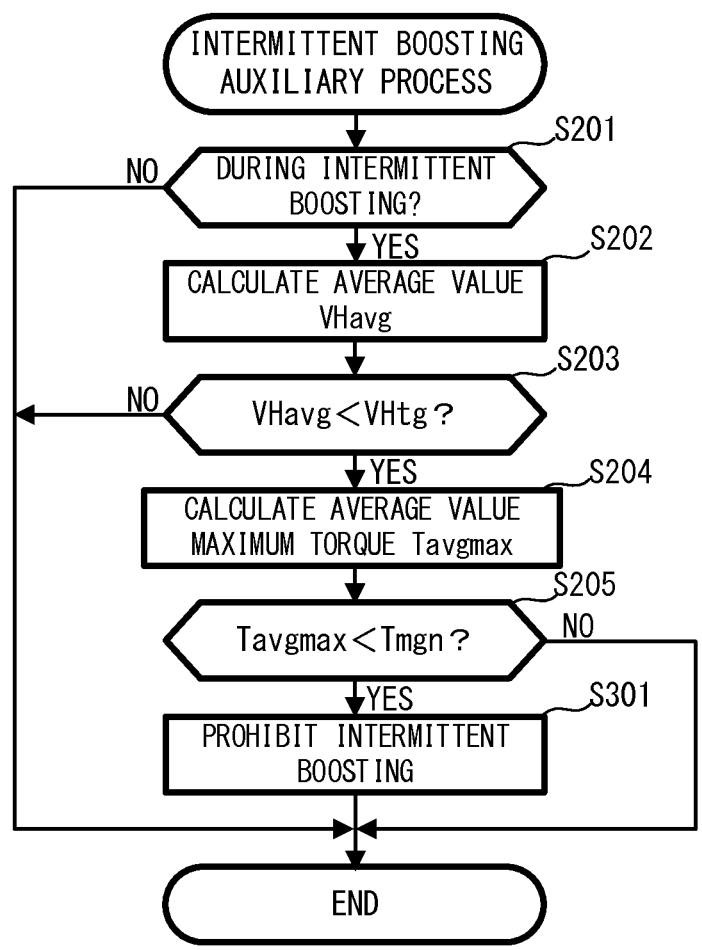
FIG. 11 is a flowchart illustrating an intermittent boosting auxiliary process according to a second embodiment of the present invention.

Next, the intermittent boosting auxiliary process in a second embodiment of the present invention which is to solve the same problem will be explained with reference to FIG. 11. FIG. 11 is a flowchart illustrating the intermittent boosting auxiliary process according to the second embodiment. In FIG. 11, the same parts as those in FIG. 10 will carry the same reference numerals, and the explanation thereof will be omitted as occasion demands.

In FIG. 11, when the average value maximum torque Tavgmax is less than the required torque Tmgn (the step S205: YES), the intermittent boosting is prohibited (step S301). After the intermittent boosting is prohibited, the intermittent boosting auxiliary process is ended. When the intermittent boosting is prohibited, the step S102 in FIG. 5 branches to the "NO" side, and thus, the boost control is basically regularly executed. Namely, in this case, steady drive of the motor generator MG is prioritized over the reduction of the system loss Lsys. The situation in which the average value maximum torque Tavgmax is less than the required torque rarely occurs, and in practice, it is limited to a case where the motor generator MG is driven in a high-load manner, or similar cases. Therefore, even if the intermittent boosting is prohibited as described above, the effect of the reduction of the system loss Lsys is not significantly deteriorated.

In the flow in FIG. 11, after the intermittent boosting is prohibited, the step S201 is repeated and the intermittent boosting cannot be restarted. Thus, the program may be configured to permit the restart of the intermittent boosting when the target value VHtg of the boost control is set in the intermittent control process in FIG. 5 and the set target value VHtg satisfies a predetermined condition. The predetermined condition may be, for example, a condition that the target value VHtg is less than or equal to a threshold value, a condition that a rate of change of the target value VHtg has a negative value (i.e. the target value VHtg decreases), or the like.

Third Embodiment

Figure 12:
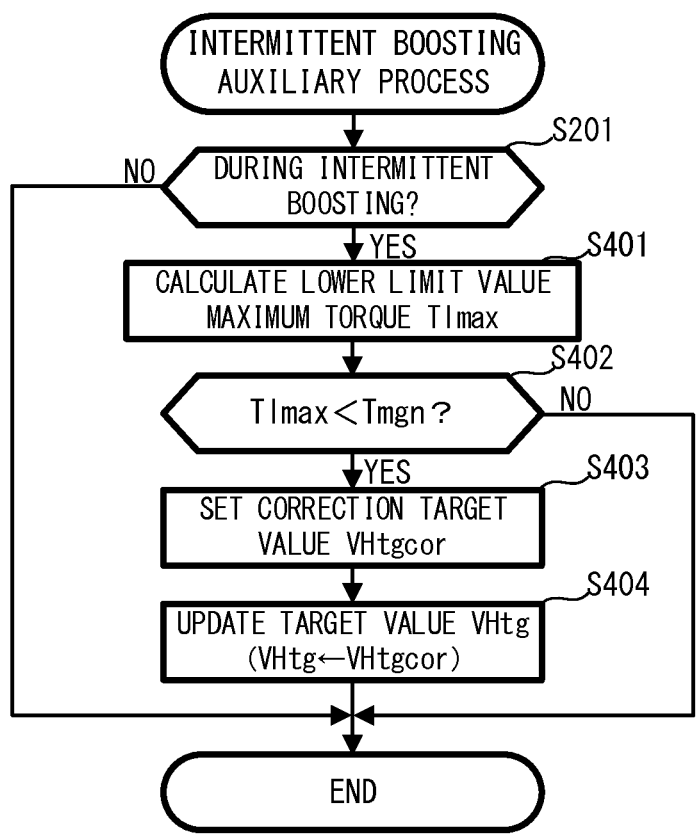
FIG. 12 is a flowchart illustrating an intermittent boosting auxiliary process according to a third embodiment of the present invention.

Next, the intermittent boosting auxiliary process in a third embodiment of the present invention which is to solve the same problem will be explained with reference to FIG. 12. FIG. 12 is a flowchart illustrating the intermittent boosting auxiliary process according to the third embodiment. In FIG. 12, the same parts as those in FIG. 10 will carry the same reference numerals, and the explanation thereof will be omitted as occasion demands.

In FIG. 12, when the intermittent boosting is executed (the step S201: YES), the lower limit value VHL of the voltage variation allowable range at that time point is obtained, and lower limit value maximum torque Tlmax is calculated (step S401). The lower limit value maximum torque Tlmax is value corresponding to the motor rotational speed MRN on L_VHL in FIG. 9 and is maximum torque that can be outputted from the motor generator MG with the lower limit value VHL. A relation between the value of the output voltage VH of the boost converter 200 and the corresponding maximum torque of the motor generator MG is obtained, experimentally, experientially, or theoretically in advance, and is stored in the ROM.

After the lower limit value maximum torque Tlmax is calculated, it is determined whether or not the calculated lower limit value maximum torque Tlmax is less than the required torque Tmgn of the motor generator MG (step S402). When the lower limit value maximum torque Tlmax is greater than or equal to the required torque Tmgn (the step S402: NO), the intermittent boosting auxiliary process is ended.

On the other hand, when the lower limit value maximum torque Tlmax is less than the required torque Tmgn (the step S402: YES), the correction target value VHtgcor is set (step S403). After the correction target value VHtgcor is set, the target value VHtg is updated from the current target value VHtg to the correction target value VHtgcor (step S404). After the correction target value VHtgcor is newly set to the target value VHtg, the target value of the boost control in the intermittent control process in FIG. 5 is the newly set target value VHtg.

Here, the correction target value VHtgcor is determined, for example, in the following procedure.

Firstly, a difference value $\Delta T'$ between the required torque Tmgn and the lower limit value maximum torque Tlmax ($\Delta T'$=Tmgn−Tlmax) is calculated. Then, the current target value VHtg and the difference value $\Delta T'$ are added to calculate the correction target value VHtgcor (VHtgcor=VHtg+$\Delta T'$). The difference value $\Delta T'$ is a positive value, and thus the correction target value VHtgcor is greater than the target value VHtg at that time point. Namely, the target value VHtg is corrected to be increased.

Here, the lower limit value VHL is a value that is uniquely determined according to the target value VHtg, which is different from the average value VHavg. Although a time for at least one unit intermittent process is required to calculate the average value VHavg, the lower limit value VHL is a value that can be set at substantially the same time as the setting of the target value VHtg. Moreover, the lower limit value VHL is a lower limit value of values that can be the average value VHavg theoretically, considering the concept of the average value VHavg. Therefore, the lower limit value VHL can be used as the average value VHavg of the output voltage VH corresponding to a most strict load condition, and is a reasonable index to ensure the drive of the loading apparatus.

Moreover, the lower limit value VHL is a value that is uniquely determined according to the target value VHtg. Thus, if the difference value $\Delta T'$ between the required torque Tmgn and the lower limit value maximum torque Tlmax is added to the target value VHtg, the lower limit value VHL certainly exceeds the required torque Tmgn. When the lower limit value VHL exceeds the required torque Tmgn, the operational of the motor generator MG is not limited. Moreover, when the lower limit value VHL exceeds the required torque Tmgn, an influence of the undershoot on the drive of the motor generator MG is reduced even if the aforementioned undershoot temporarily occurs.

As described above, according to the embodiment, the drive of the loading apparatus according to the requirements is ensured, quickly and certainly. Moreover, if only the difference value between the average value maximum torque Tavgmax and the required torque Tmgn is used as in the first embodiment, the operation (the output) of the motor generator MG is limited on the basis of an unstable index which is the average value VHavg. Therefore, when the target operating point is located near L_VHavg such as the operating point m1 in FIG. 9, there is also a possibility that the required torque Tmgn exceeds the average value maximum torque Tavgmax for some reason. If the lower limit value is set as a determination index value, there is little possibility that such a problem occurs.

Fourth Embodiment

Figure 13:
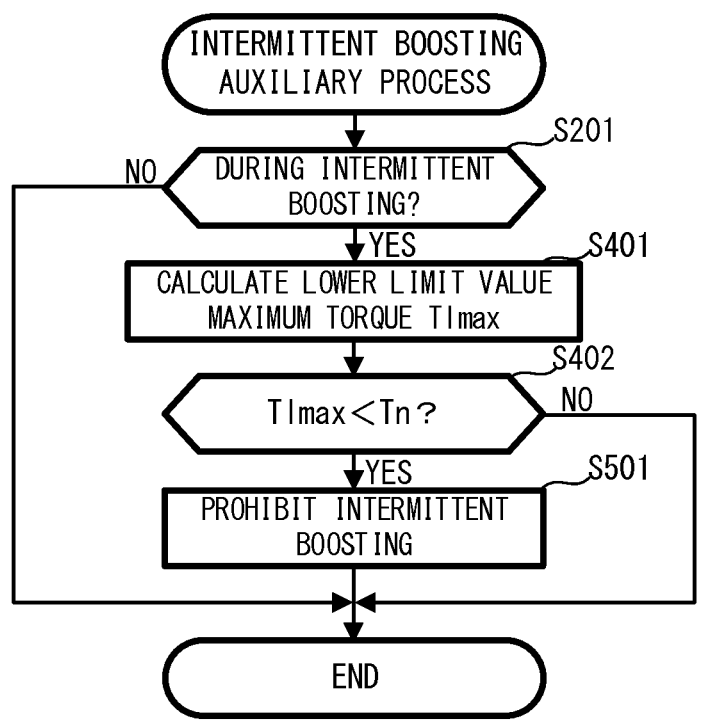
FIG. 13 is a flowchart illustrating an intermittent boosting auxiliary process according to a fourth embodiment of the present invention.

Next, the intermittent boosting auxiliary process in a fourth embodiment of the present invention which is to solve the same problem will be explained with reference to FIG. 13. FIG. 13 is a flowchart illustrating the intermittent boosting auxiliary process according to the fourth embodiment. In FIG. 13, the same parts as those in FIG. 12 will carry the same reference numerals, and the explanation thereof will be omitted as occasion demands.

In FIG. 13, when the lower limit value maximum torque Tlmax is less than the required torque Tmgn (the step S402: YES), the intermittent boosting is prohibited (step S501). After the intermittent boosting is prohibited, the intermittent boosting auxiliary process is ended. When the intermittent boosting is prohibited, the step S102 in FIG. 5 branches to the "NO" side, and thus, the boost control is basically regularly executed. In other words, in this case, the steady drive of the motor generator MG is prioritized over the reduction of the system loss Lsys.

In the flow in FIG. 13, after the intermittent boosting is prohibited, the step S201 is repeated. Therefore, the intermittent boosting cannot be restarted. Thus, the program may be configured in such a manner that the step S401 and the step S402 in FIG. 13 are independently executed in a period in which the intermittent boosting is prohibited and that the restart of the intermittent boosting is permitted when the step S402 continues to branch to the "NO" side by fixed times or for a fixed period.

The intermittent boosting auxiliary processes in the first to fourth embodiments can be combined to each other to be executed. For example, the program may be configured in such a manner that the intermittent boosting auxiliary processes in the third embodiment is executed only when it is determined that the average value VHavg is hardly accurately calculated while the intermittent boosting auxiliary process in the first embodiment is executed as a main process.

The present invention is not limited to the aforementioned embodiments, but various changes may be made, if desired, without departing from the essence or spirit of the invention which can be read from the claims and the entire specification. A boost converter control apparatus which involves such changes is also intended to be within the technical scope of the present invention.

INDUSTRIAL APPLICABILITY

The present invention can be applied to the system in which the power supply voltage is boosted by the boost converter to drive the loading apparatus.

DESCRIPTION OF REFERENCE NUMERALS AND LETTERS

10 motor drive system
100 control apparatus
110 boost control unit
120 inverter control unit
200 boost converter
300 inverter
C capacitor
B direct current power supply
MG, MG1, MG2 motor generator

The invention claimed is:
1. A boost converter control apparatus which is configured to control a boost converter in a power supply system, the power supply system comprising:
a DC (direct current) power supply having power supply voltage;
the boost converter including a switching device, the boost converter being configured to boost and output the power supply voltage to a loading apparatus by boost control including switching of a switching state of the switching device according to a target value; and a voltage sensor which is configured to detect output voltage of the boost converter, the boost converter control apparatus comprising a controller, the controller being configured to:

execute an intermittent process of the boost control in such a manner that the output voltage is maintained in a predetermined range including the target value, on the basis of the detected output voltage;

calculate an average value of the output voltage in an execution period of the intermittent process; and correct the target value to increase the target value when the calculated average value is less than the target value and is less than a required voltage value of the loading apparatus.

2. The boost converter control apparatus according to claim 1, wherein the controller corrects the target value to increase the target value on the basis of a difference between the required voltage value and the calculated average value.

3. The boost converter control apparatus according to claim 1, wherein the controller, when executing the intermitting process, stops the boost control when the detected output voltage reaches the target value in the execution period of the boost control, and restarts the boost control when the detected output voltage reaches a boundary value of the predetermined range in a stop period of the boost control.

4. The boost converter control apparatus according to claim 1, wherein the controller starts the intermittent process of the boost control when a variation width of the output voltage is within a predetermined value.

5. A boost converter control apparatus which is configured to control a boost converter in a power supply system, the power supply system comprising:

a DC (direct current) power supply having power supply voltage;

the boost converter including a switching device, the boost converter being configured to boost and output the power supply voltage to a loading apparatus by boost control including switching of a switching state of the switching device according to a target value; and a voltage sensor which is configured to detect output voltage of the boost converter, the boost converter control apparatus comprising a controller, the controller being configured to:

execute an intermittent process of the boost control in such a manner that the output voltage is maintained in a predetermined range including the target value, on the basis of the detected output voltage; and correct the target value to increase the target value when a lower limit value of the predetermined range is less than a required voltage value of the loading apparatus.

6. The boost converter control apparatus according to claim 5, wherein the controller corrects the target value to increase the target value on the basis of a difference between the required voltage value and the lower limit value.

7. The boost converter control apparatus according to claim 5, wherein the controller, when executing the intermitting process, stops the boost control when the detected output voltage reaches the target value in the execution period of the boost control, and restarts the boost control when the detected output voltage reaches a boundary value of the predetermined range in a stop period of the boost control.

8. The boost converter control apparatus according to claim 5, wherein the controller starts the intermittent process of the boost control when a variation width of the output voltage is within a predetermined value.

9. A boost converter control apparatus which is configured to control a boost converter in a power supply system, the power supply system comprising:

a DC (direct current) power supply having power supply voltage;

the boost converter including a switching device, the boost converter being configured to boost and output the power supply voltage to a loading apparatus by boost control including switching of a switching state of the switching device according to a target value; and a voltage sensor which is configured to detect output voltage of the boost converter, the boost converter control apparatus comprising a controller, the controller being configured to:

execute an intermittent process of the boost control in such a manner that the output voltage is maintained in a predetermined range including the target value, on the basis of the detected output voltage;

calculate an average value of the output voltage in an execution period of the intermittent process; and prohibit the execution of the intermittent process when the calculated average value is less than the target value and is less than a required voltage value of the loading apparatus.

10. The boost converter control apparatus according to claim 9, wherein the controller starts the intermittent process of the boost control when a variation width of the output voltage is within a predetermined value.

11. A boost converter control apparatus which is configured to control a boost converter in a power supply system, the power supply system comprising:

a DC (direct current) power supply having power supply voltage;

the boost converter including a switching device, the boost converter being configured to boost and output the power supply voltage to a loading apparatus by boost control including switching of a switching state of the switching device according to a target value; and a voltage sensor which is configured to detect output voltage of the boost converter, the boost converter control apparatus comprising a controller, the controller being configured to:

execute an intermittent process of the boost control in such a manner that the output voltage is maintained in a predetermined range including the target value, on the basis of the detected output voltage; and prohibit the execution of the intermittent process when a lower limit value of the predetermined range is less than a required voltage value of the loading apparatus.

12. The boost converter control apparatus according to claim 11, wherein the controller starts the intermittent process of the boost control when a variation width of the output voltage is within a predetermined value.

* * * * *